J. F. MANAHAN.
Operating Stop-Cocks.
No. 152,499. Patented June 30, 1874.
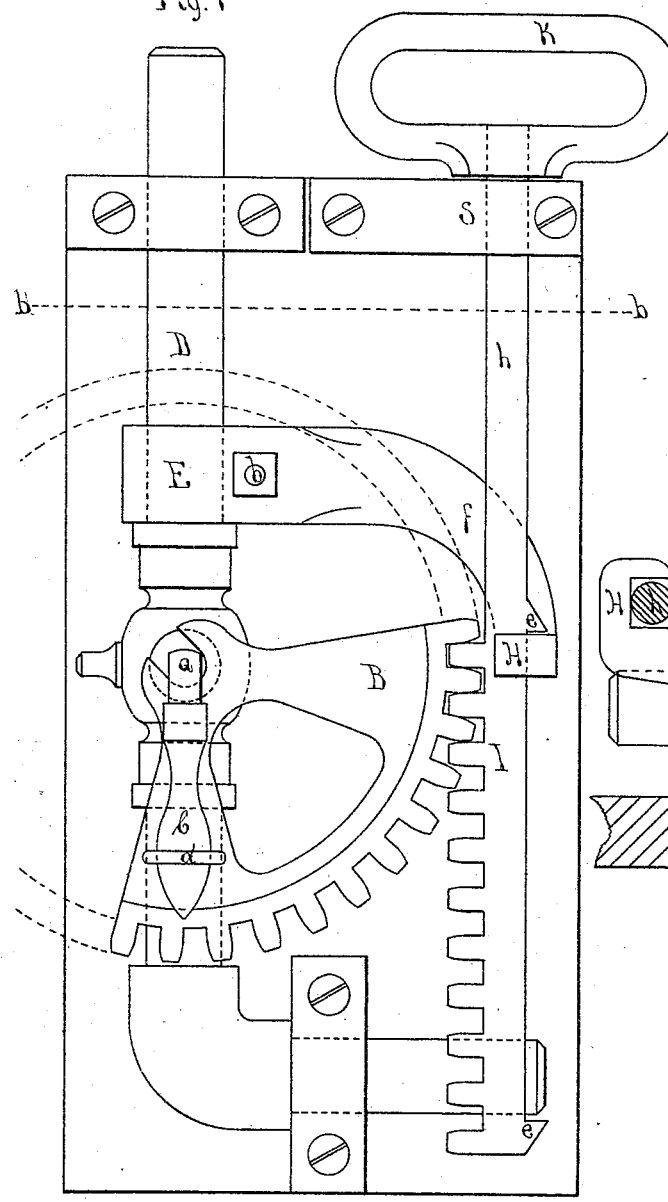
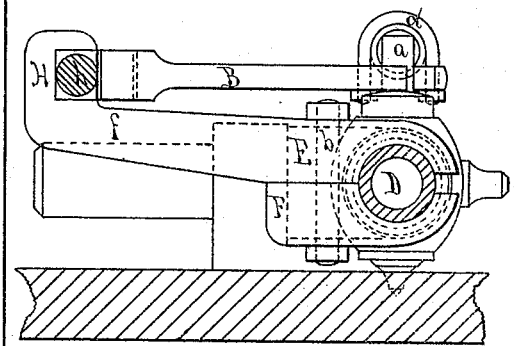
Witnesses
John E. Crane
John L. Hunt
Inventor
John F. Manahan

UNITED STATES PATENT OFFICE.

JOHN F. MANAHAN, OF LOWELL, MASSACHUSETTS.

IMPROVEMENT IN OPERATING STOP-COCKS.

Specification forming part of Letters Patent No. 152,499, dated June 30, 1874; application filed April 18, 1874.

*To all whom it may concern:*

Be it known that I, JOHN F. MANAHAN, of Lowell, in the county of Middlesex and State of Massachusetts, have invented a new and useful Improvement in the Apparatus for Opening and Closing the Stop and Waste Cocks in the water-supply pipes used in stores, dwelling-houses, and other buildings; of which the following is a full, clear, and exact description, reference being had to the accompanying drawings, making part of this specification, in which—

Figure 1 is a side elevation, and Fig. 2 a cross-section, on the line $a\ b$ of Fig. 1.

This invention has for its object to open and to close the stop and waste cocks in water-supply pipes, and thereby to allow water to flow into or through such pipes, or to cause the water to stop or cease flowing, and to empty the pipes by means or mechanism connected with the handle or lever of the stop and waste cock, and with the water-pipe, by a fixed clamp and a fixed arm and guides, as hereinafter described, and extending to any reasonable distance from such stop and waste cock above it, or in an upper apartment, or on a line therewith, whenever there is a liability of the water freezing in the pipes. In most cases, the stop and waste cock in a water-supply pipe in a dwelling, store, or other building is located in the cellar or beneath the cellar-floor, or in a recess or cavity in the wall of the cellar, or where the effect of frost or freezing weather will not be liable to congeal the water between the stop and waste cock and the street-main; and in order to close the stop and waste cock, and to empty the water-pipes inside of the cock to prevent freezing the water in the pipes, and also to open the stop and waste cock, it becomes necessary that some person shall go to the cellar, which is frequently over two or more flights of stairs, to shut off the water at night and to let on the water in the morning and at other times in very cold weather. This traveling up and down stairs to let on or to shut off the water is a very great inconvenience, especially if water is wanted during the night-time, after the water has been shut off.

To overcome the aforesaid difficulties, which result in so much trouble and inconvenience, I apply to the stem $a$ of the stop and waste cock a gear or a toothed segment, B, which is fastened to the handle or lever C by a staple, $d$, or other suitable device, which shall permanently hold the gear to the lever; and to some part of the pipe D I apply a clamp, E, having a jaw, F, and a bolt, $b$, to firmly hold the clamp to the pipe. One part, E, of this clamp is curved round in the form of an arm, which is a fixed arm, $f$, the end of which is constructed with a notched guide, H, and in this guide a sliding toothed rack, I, is applied, the teeth of the rack meshing into the teeth of the gear or segment B, about as shown in Fig. 1. A rod, $h$, extends from either end of the rack, and in practice this rod extends upward to the first, second, or other floor above, where the stop and waste cock and the connected apparatus are located, so as to operate the lever C to open or close the cock by pulling or pushing on the handle $k$ of the rod $h$ connected or united to the end of the rack. One or more guides, S, for the rod $h$ are arranged in suitable positions between the water opening and closing apparatus and the end or handle $k$ of the operating-rod. One or more stops, $e$, are formed on the bar of the rack I, each stop having a shoulder to come against the notched guide H and arrest the motion of the rack and the gear or segment, when operating these, to open or to close the stop and waste cock, or to insure its perfect opening and closing operation.

The operating-rod $h$ may extend from the rack bar horizontally any reasonable distance, to a point beneath or near a vertical line with a sink or water-bowl, one, two, or more floors above the horizontal rod, to the end of which a second and a vertical rod may connect by suitable mechanical means, so as to operate the horizontal rod and the connected rack and segment and lever C by the vertical rod leading to near the water-bowl or sink above.

The clamp E and its arm and guide may be connected to some other support than the pipe D and still serve the purpose required, and, if preferred, a different but equivalent guide may be substituted for the guide H, and not connected with the pipe.

I claim as my invention—

1. The fixed clamp E, with its fixed arm $f$, having the notched guide H, in combination with the water-pipe and with the rack I and segment B, and the stop and waste cock, substantially as described.

2. One or more stops, $e$, in combination with the rack-bar I and with the fixed clamp E and arm $f$, and notched guide H, substantially as described.

JOHN F. MANAHAN.

Witnesses:
 JOHN E. CRANE,
 J. L. HUNT.